United States Patent [19]

Frank et al.

[11] 4,038,340

[45] July 26, 1977

[54] UNSATURATED POLYESTER RESINS WHICH HAVE RADICALS OF MONOHYDRIC ALCOHOLS AS TERMINAL GROUPS

[75] Inventors: Walter Frank; Karl Raichle; Otto Bendszus; Manfred Patheiger, all of Krefeld, Germany

[73] Assignee: Bayer Aktiengesellschaft, Germany

[21] Appl. No.: 697,418

[22] Filed: June 18, 1976

[30] Foreign Application Priority Data

June 21, 1975 Germany .............................. 2527675

[51] Int. Cl.² ...................... C07C 69/44; C07C 69/74; C07C 69/80

[52] U.S. Cl. .............................. 260/861; 260/75 UA; 260/77

[58] Field of Search .................... 260/77, 861, 75 UA, 260/468 R, 475 P, 479 R

[56] References Cited

U.S. PATENT DOCUMENTS

| 3,402,147 | 9/1968 | Starck et al. ...................... 260/77 X |
| 3,578,728 | 4/1971 | Ehrhart et al. .................. 260/861 X |
| 3,819,760 | 6/1974 | Aito et al. ............................. 260/861 |
| 3,822,325 | 7/1974 | Blaise et al. .......................... 260/861 |
| 3,898,144 | 8/1975 | Rudolph et al. ................. 260/861 X |
| 3,907,863 | 9/1975 | Voss ................................... 260/77 X |

Primary Examiner—Murray Tillman
Assistant Examiner—T. De Benedictis, Sr.
Attorney, Agent, or Firm—Connolly and Hutz

[57] ABSTRACT

Unsaturated polyester resins, the polyesters of which contain 0.3 – 0.7 moles, relative to the alcohol component, of units of monohydric alcohols are outstandingly suitable for the production of cured lacquer films which are uniformly matt without matting additives when a barrier agent is used.

1 Claim, No Drawings

UNSATURATED POLYESTER RESINS WHICH HAVE RADICALS OF MONOHYDRIC ALCOHOLS AS TERMINAL GROUPS

The present invention relates to polyester resins based on α,β-ethylenically unsaturated polyesters, a large proportion of the end groups of which consists of radicals of certain monohydric alcohols, and copolymerisable monomers.

When the conventional unsaturated polyester resins are used in coating agents and lacquers, which contain barrier agents, for example paraffins and/or waxes or stearins, in order to prevent the inhibiting effect of atmospheric oxygen, matted surfaces are formed which are interrupted to a greater or lesser extent by glossy areas and which exhibit a structure which is pronounded to varying degrees depending on the processing conditions, such as the ambient temperature, atmospheric humidity, atmospheric pressure, air movement and, especially the lacquer temperature which arises during curing. This inhomogeneous structure must be removed by buffing. The matting effect can be improved by adding, to the lacquer, further matting agents, such as microinsed silica, polypropylene or waxes, but the uniform incorporation of these agents requires additional work. However, this measure is also highly dependent on the processing conditions, especially on the lacquer temperature. In addition, the resistance to scratching of the cured lacquer film surfaces suffers when inorganic matting agents are used.

The object of the invention is to provide polyester resins which are not subject to the abovementioned disadvantages.

The invention relates to polyester resins which contain barrier agents and are based on A. 60-90% by weight of α,β-ethylenically unsaturated polyesters and B. 40-10% by weight of copolymerisable monomers, the percentage being based on the weight of the sum of components (A) and (B) wherein the polyesters (A) contain, per mol of polycarboxylic acid radical 0.65 - 0.95 mol of radicals of polyhydric, mainly dihydric, alcohols, 0.30-0.70 mol of radicals of monohydric alcohols with 1-16 carbon atoms, 0.25-0.55 mol of which possess an aromatic and/or cycloaliphatic ring with 5-12 carbon atoms, the molar ratio of OH groups to COOH groups of the components of the polyesters (A) being at least 0.9.

It is well known that the softening range of the polyesters is lowered, their solubility in non-polar solvents is improved and the viscosity of the resulting resins can be reduced by esterification of the polar end groups (hydroxyl groups and carboxyl groups) of unsaturated polyesters with monofunctional compounds (Kunststoff-Handbuch (Plastics Handbook), volume VIII, "Polyester" ("Polyesters"), Carl-HanserVerlag, Munich 1973, 264), but it was extremely surprising that the cured lacquer layers produced from the polyester resins according to the invention already exhibit uniformly matt completely homogeneous surfaces when the barrier agent is used and without further matting additives, which surfaces can be reproduced in the same quality, largely independently of the processing conditions. The polyester resins according to the invention are therefore outstandingly suitable for the simple production of so-called finished effect lacquers, that is to say lacquers which give cured lacquer films which are so uniformly matt and scratch-resistant that they can be used industrially, for example for coating wood, pressboards, paper and plastics in the furniture industry.

α,β-Ethylenically unsaturated polyesters (A) for use in polyester resins of the invention are polycondensation products of at least α, β-ethylenically unsaturated dicarboxylic acid or anhydride with as a rule 4 or 5 C atoms, or of the ester-forming derivatives thereof optionally admixed with up to 33 mol%, based on the unsaturated acid components of at least one aliphatic saturated dicarboxylic acid with 4-10 C atoms, or a cycloaliphatic or aromatic dicarboxylic acid with 8-0 C atoms, or the ester-forming derivatives thereof, with at least one polyhydroxy compound, especially a dihydroxy compound, with 2-20 C atoms and, in contrast to the conventional polyesters, such as are described in J. Bjorksten et al., "Polyesters and their Applications", Reinhold Publishing Corp., New York 1956, with, in addition, high proportions of monohydric alcohols according to the above specification.

Maleic acid or maleic anhydride and fumaric acid or their derivatives are examples of unsaturated dicarboxylic acids or anhydrides which are preferably to be used. However, it is also possible to use, for example, mesaconic acid, citraconic acid, itaconic acid or chloromaleic acid. Examples of aliphatic saturated, cycloaliphatic and aromatic dicarboxylic acids, or their derivatives, to be used are phthalic acid or phthalic anhydride, isophthalic acid, terephthalic acid, hexahydrophthalic acid or tetrahydrophthalic acid and their anhydrides, endomethylenetetrahydrophthalic acid or its anhydride, succinic acid or succinic anhydride and succinic acid esters and succinic acid chlorides, adipic acid and sebacic acid. In order to prepare resins of low inflammability, it is possible to use, for example, hexachloroendomethylenetetrahydrophthalic acid (het-acid), tetrachlorophthalic acid or tetrabromophthalic acid. Polyesters which are preferably to be used contain maleic acid radicals and/or fumaric acid radicals, up to 25 mol% of which can be replaced by phthalic acid radicals or isophthalic acid radicals. Dihydric alcohols which can be employed are ethylene glycol, propane-1,2-diol, propane-1,3-diol, diethylene glycol, dipropylene glycol, butane-1,3-diol, butane-1,4-diol, neopentyl glycol, hexane-1,6-diol, 2-methyl- and 2-ethyl-propane-1,3-diol, cyclohexane-1,4-dimethanol, 2,2-bis-(4-hydroxycyclohexyl)-propane, bis-oxalkylated bisphenol A and others. Ethylene glycol, propane-1,2-diol, diethylene glycol, dipropylene glycol and neopentyl glycol are preferably used.

In order to obtain lacquer films which are as hard as possible, those polyester resins according to the invention in which the unsaturated polyesters (A) contain, per mol of polycarboxylic acid radical, more than 0.85 mol of α,β-ethylenically unsaturated dicarboxylic acid radicals are preferred.

Examples of monohydric alcohols with 1-16 carbon atoms, which may be employed according to the invention, are saturated aliphatic, cycloaliphatic and aromatic alcohols, such as n-butanol, all hexanols, octanols (preferably 2-ethylhexan-1-ol), and decanols, cetyl alcohol, cyclohexanol, o-, m- and p-chlorocyclohexanol, o-, m- and p-methylcyclohexanol, hexahydrobenzyl alcohol, 2,4- and 2,6-dichlorobenzyl alcohol, 2,3- and 3,5-dimethylbenzyl alcohol, p-ethylbenzyl alcohol, β-phenylethanol and preferably unsubstituted benzyl alcohol.

Further modifications are possible by incorporation of up to 10 mol%, based on the alcohol component, of trihydric and tetrahydric alcohols with 3–6 C atoms, such as trimethylolpropane, glycerol, hexanetriol and pentaerythritol.

The acid numbers of the polyesters should be between 1 and 50, preferably between 10 and 30, the OH numbers should be between 10 and 75, preferably between 10 and 40 and the molecular weights $M_n$, measured as a number average, should be between about 300 and 3,000, preferably between about 400 and 1,000 (measured by vapour pressure osmometry in dioxane and acetone; in the case of differing values, the lower value is regarded as being correct).

If the content of radicals of monohydric alcohols exceeds 0.70 mol per mol of polycarboxylic acid radical, polycondensates which have an undesirably high content of low-molecular polycarboxylic acid esters, for example fumaric acid bis-esters of the monohydric alcohols, are obtained, and this leads to an impairment in the properties of cured products of polyester resins prepared therefrom. If the content of radicals of monohydric alcohols falls below 0.30 mol per mol of polycarboxylic acid radical, the advantageous technical effect, described above, of polyester resins which are prepared therefrom and contain barrier agents no longer exists. If more than 0.55 mol of the radicals of monohydric alcohols possess an aromatic or cycloaliphatic ring, the barrier agent can separate out prematurely and this prevents the necessary deaeration of the lacquer film; with contents below 0.25 mol, the barrier agent no longer separates out in an optimum manner.

The polyesters (A) are prepared in a known manner, for example by melt condensation at 150°–200° C under an inert gas atmosphere and if necessary in the presence of small amounts of inhibitors. Losses of volatile alcohols, which mainly arise at the start of the polycondensation, can be replenished by further additions during the polycondensation or can be compensated by increasing the amount employed, after determining the loss. The polycondensation can be discontinued when the acid number of the polyester has reached the desired value. An 80% strength by weight solution of the polyester in styrene then has a viscosity, measured according to DIN 53,015, of 400–5,000, preferably 600–2,500, cP.

Suitable copolymerisable monomers (B) for use in the invention are unsaturated compounds which are customary in polyester technology and which carry α-substituted vinyl or vinylidene groups or β-substituted allyl groups, preferably styrene, but also, for example, styrenes which are chlorinated and alkylated or alkenylated in the nucleus, it being possible for the alkyl groups to contain 1–4 carbon atoms, such as, for example, vinyltoluene, divinylbenzene, tert.-butylstyrene and chlorostyrenes; the esters of acrylic acid and methacrylic acid (preferably the vinyl, ally and methallyl, hexane-1,6-diol, trimethylolpropane and pentaerythritol esters) with 1–6 carbon atoms in the alcohol component, their amides and nitriles as well as minor proportions of vinyl esters of carboxylic acids with 2–6 carbon atoms, preferably vinyl acetate, divinyl adipate, vinylpyridine and vinylnaphthalene.

In order to protect the resins according to the invention against undesirable premature polymerisation, it is advisable to add 0.001–0.1 part by weight, based on 100 parts by weight of the mixture of unsaturated polyester (A) and copolymerisable monomer (B), of polymerisation inhibitors or antioxidants as early as the preparation stage. Examples of suitable auxiliaries of this type are phenols and phenol derivatives, preferably sterically hindered phenols which contain alkyl substituents with 1–6 C atoms in the two positions ortho to the phenolic hydroxyl group, amines, preferably secondary arylamines and their derivatives, quinones, copper salts of organic acids and addition compounds of copper-I halides with phosphites, such as, for example, 4,4'-bis-(2,6-di-tert.-butylphenol), 1,3,5-trimethyl-2,4,6-tris-(3,5-di-tert.-butyl-4-hydroxybenzyl)-benzene, 4,4'-butylidene-bis-(6-tert.-butyl-m-cresol), 3,6-di-tert.-butyl-4-hydroxy-benzylphosphonic acid diethyl ester, N,N'-bis-(β-naphthyl-p-phenylenediamine), N,N'-bis-(1-methylheptyl)-p-phenylenediamine, phenyl-β-naphthylamine, 4,4'-bis-(α,α-dimethylbenzyl)-diphenylamine, 1,3,5-tris-(3,5-di-tert.-butyl-4-hydroxyhydrocinnamoyl)-hexanhydro-s-triazine, hydroquinone, p-benzoquinone, toluhydroquinone, p-tert.-butylcatechol, chloranil, naphthoquinone, copper naphthenate, copper octoate, Cu-(I)Cl/triphenyl phosphite, Cu(I)Cl/trimethyl phosphite, Cu(I)Cl/tris-chloroethyl phosphite, Cu(I)Cl/tripropyl phosphite and p-nitrosodimethylaniline. Other suitable stabilisers are described in "Methoden der organischen Chemie" ("Methods of organic Chemistry") (Houben-Weyl), 4th edition, volume XIV/1, page 433–452 and 756, Georg-Thieme-Verlag, Stuttgart, 1961. For example, p-benzoquinone in a concentration of from 0.01 to 0.05% by weight, based on the sum of components (A) and (B), is very suitable.

The mixtures according to the invention are generally cured by cold-curing in a known manner with the aid of radicals which initiate polymerisation (Wagner/Sarx, Lackkunstharze (Synthetic Resins for use in Lacquers), 5th edition, chapter on Unsaturated Polyester Resins), for example by means of initiator/accelerator systems such as diacyl peroxide/tertiary aromatic amines, for example dibenzoyl peroxide or diacetyl peroxide/dimethylaniline, or such as hydroperoxide/heavy metal salts of carboxylic acids, or chelates of these metals, for example methyl ethyl ketone hydroperoxide or cyclohexanone hydroperoxide/cobalt octoate, naphthenate or acetylacetonate, manganese octoate, naphthenate or acetylacetonate or vanadium octoate, naphthenate or acetylacetonate.

It is also possible to use additional accelerators, such as the generally customary dicarbonyl compounds, for example ethyl acetoacetate, acetoacetic acid N-alkylamides, acetylacetone and also the phosphines, arsines and stibines which are described as accelerators in DT-OS (German Published Specification) 1,769,952.

The customary amounts are to be employed, such as 0.5–5 parts by weight of peroxides, 0.01–0.2 part by weight of heavy metal in the accelerator and 0.1–5 parts by weight of additional accelerator, based on 100 parts by weight of the mixture of unsaturated polyester (A) and copolymerisable monomer (B).

In place of the above sources of free radidals, it is also possible to employ the known photoinitiators, such as, for example, benzophenones, benzoins or benzoin ethers. Suitable benzophenones are, for example, compounds of the formula

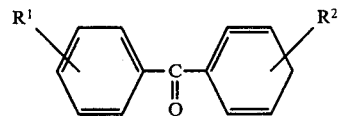

in which
R[1] denotes CH$_2$X, CHX$_2$ or CH$_3$,
R[2] denotes hydrogen, methyl, CH$_2$X, CHX$_2$ or CX$_3$ and
X denotes chlorine, bromine or iodine.

Suitable benzoins and benzoin ethers are, for example, compounds of the formula

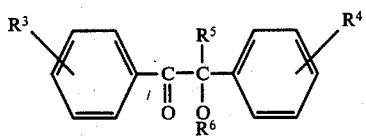

in which
R[3] and R[4] denote hydrogen, alkyl or alkoxy with 1–4 C atoms or halogen,
R[5] denotes hydrogen, alkyl with 1–4 C atoms, aryl with 6–12 C atoms, aralkyl with 7–10 C atoms, hydroxymethyl or its sulphonic acid ester, and
R[6] denotes alkyl with 1–6 C atoms, aryl with 6–12 C atoms, benzyl, trimethylsilyl or hydrogen.

In order to protect light-sensitive substrates, for example light-coloured woods, small amounts of the customary UV absorbers can be added to the coating compositions. Examples of these absorbers are, for example, 2-hydroxy-4-methoxybenzophenone and the cinnamic acid derivatives and benzotriazine derivatives which are customarily used.

It is also possible, if desired, to add the customary thixotropic agents, for example inorganic agents, such as aerosil, or organic agents, such as polyisocyanates, polyesteramides, polyamides, polyurethanes or cyclohexylamides of higher fatty acids (DT-AS (German Published Specification) 1,182,816 and 1,217,611 and Belgian Patent Specifications 693,580 and 727,952), in effective amounts.

Customary additives which can also be used are inert inorganic fillers, such as calcium carbonate, silicates and argillaceous clays, organic and inorganic pigments, dyestuffs, antifoaming agents and the like.

The lacquers produced from the resins according to the invention are applied by means of methods which are in themselves known (Wagner, Sarx, Lackkunstharze (Synthetic Resins for use in Lacquers), 5th edition, page 140 and 141 and Weigel, Katalytische Lackhartung und ihre Rohstoffe (Catalytic Curing of, and Raw Materials for, Lacquers), page 192–202) in layer thicknesses of from 50 to 800μ, preferably 100 to 500μ, and in the case of peroxidic sources of free radicals, are cured preferably at temperatures below the melting point of the barrier agent or, if necessary, at higher temperatures after the barrier agent has separated out, in the case of photoinitiators are cured by means of UV light and, when curing is to be carried out without the addition of sources of free radicals, are cured by high energy radiation, such as, for example γ-radiation.

The examples which follow illustrate the invention. They confirm, by the formation of uniform matt lacquer films, that the separating out of the barrier agent is superior. The examples also show that the advantages according to the invention are obtained independently of the operating conditions and the mode of application.

Percentages quoted in the following text are percentages by weight.

EXAMPLES

The polyesters of the UP resins (A)–(C) were prepared from the components indicated below by melt condensation at 190° C under an inert gas atmosphere.

| Polyester for the UP resin | A (comparison) [mol] | B [mol] | C [mol] |
|---|---|---|---|
| Maleic anhydride | 0.7 | 1.0 | 1.0 |
| Phthalic anhydride | 0.3 | — | — |
| Propane-1,2-diol | 1.03 | 0.85 | 0.85 |
| Benzyl alcohol | — | 0.36 | 0.50 |
| 2-Ethylhexan-1-ol | — | 0.12 | — |
| Acid number | 31 | 29 | 26 |
| Viscosity, measured according to DIN 53,015, 65% strength in styrene [cP] | 1,400 | — | — |
| 80% strength in styrene [cP] | — | 800 | 1,400 |

EXAMPLES 1–8

The comparison resin (A), which consists of 65% of polyester and 35% of styrene, and the resins (B) and (C), according to the invention, which each consist of 80% of polyester and 20% of styrene, were diluted, by adding further styrene, to a uniform viscosity corresponding to a flow time of 35–40 seconds, measured according to DIN 53,211.

| Example | \multicolumn{6}{c|}{Lacquers} | |
|---|---|---|---|---|---|---|---|
|  | 1 | 2 | 3 | 4 | 5 | 6 | |
| 100 parts by weight of resin | A | A | B | B | C | C | |
| Styrene | 20 | 20 | 8 | 8 | 16 | 16 | parts by weight |
| 10% strength solution of paraffin in styrene (melting point of paraffin 51–53° C) | 1.2 | 1.2 | 1.2 | 1.2 | 1.2 | 1.2 | " |
| Co octoate solution containing 2.2% of Co | 1.2 | 1.2 | 1.2 | 1.2 | 1.2 | 1.2 | " |
| Acetylacetone | — | 0.2 | — | 0.2 | — | 0.2 | " | a. Lacquers 1–6 were applied (thickness of dry film 300μ) to glass plates which were coated with a reaction substrate consisting of a 20% strength solution of nitrocellulose (of medium viscosity) in ethyl acetate, containing 10% of cyclohexanone peroxide and 10% of the polyester of resin (A) (thickness of dry film about 15μ) (process according to DT-AS (German Published Specification) 1,025,302). The surfaces of the lacquer films were assessed one hour after curing at 25° C and 25% relative atmospheric humidity.

In the case of the comparison lacquers 1a and 2a, the paraffin had separated out in a very patchy manner and the lacquer surfaces displayed a silky lustre; in the case of lacquers 3a to 6a, the paraffin had separated out uniformly and the lacquer surfaces were uniformly matt.

b. Lacquers 1-6 were mixed with 2.5 parts by weight, based on the parts by weight indicated above in the table for the other components, of methyl ethyl ketone peroxide and the mixture was applied to glass plates. The surfaces of the lacquer films were assessed one hour after curing in an air conditioned chamber at 22° C and 50% relative atmospheric humidity.

The results were the same as under (a).

c. Panels of wood 20 × 60 cm in size were smoothed with a polyester surface-filler and provided with the reaction substrate described under a). Lacquers 1-6 were pigmented with 10% of titanium dioxide by grinding, 0.5% of highly disperse silica also being used, and these lacquers were applied (250 g/m²) using a film caster. The surfaces of the lacquer films were assessed 24 hours after curing in a workroom, which was not air conditioned, at 23° C and 50-60% relative atmospheric humidity.

The surfaces of the white lacquer films 1c and 2c (comparisons) displayed a flaky paraffin structure and a silky lustre and were not scratch-resistant, whilst the white lacquer films 3c to 6c displayed flawless silky matt surfaces and were scratch-resistant.

d. White lacquers 2 and 4 were applied as under c) but were dried in a tunnel of flat shape (40° C, residence time 15 minutes, wind speed 0.5-0.7 m/second). The surfaces of the lacquer films were assessed after the films had left the tunnel and cooled to room temperature.

Whilst the surface of white lacquer film 2d exhibited an irregular structure and a silky lustre and was susceptible to scratching, the surface of lacquer film 4d was flawless, matt and scratch-resistant.

EXAMPLES 7 and 8

| Example | 7 | 8 | |
|---|---|---|---|
| 100 parts by weight of resin | A | B | |
| Styrene | 20 | 8 | parts by weight |
| Benzoin isopropyl ether | 2.5 | 2.5 | parts by weight |
| 10% strength solution of paraffin in styrene (melting point of the paraffin, 51–53° C) | 1.2 | 1.2 | parts by weight |

Lacquers 7 and 8, which can be cured by UV light, were applied to glass plates and cured by irradiation with a Philips TL-AK luminescent tube; distance from the object, 5 cm; irradiation period 5 minutes. The lacquer temperature was 22.5° C and the thickness of the dry film 300μ. The lacquer was assessed 15 seconds after curing.

The surface of lacquer film 7 was pitted, the paraffin had separated out in a very patchy manner and the surface had a silky lustre; the surface of lacquer film 8 was uniformly smooth, the paraffin had separated out uniformly and the surface was silky-matt to matt.

We claim:

1. Polyester resins which contain barrier agents and are based on
   A. 60–90% by weight, based on the sum of components (A) and
   (B), of α, β-ethylenically unsaturated polyesters and
   B. 40–10% by weight, based on the sum of components (A) and (B), of copolymerisable monomers.
characterised in that the polyesters (A) contain, per mol of polycarboxylic acid radical, in addition to 0.65–0.95 mol of radicals of polyhydric alcohols, 0.30–0.70 mol of radicals of monohydric alcohols with 1–16 carbon atoms, 0.25–0.55 mol of which possess an aromatic and/or cycloaliphatic ring with 5–12 carbon atoms, and that the molar ratio of OH groups to COOH groups of the components of the polyesters (A) should be at least 0.9.

* * * * *